Dec. 28, 1943.  T. E. McDOWELL  2,337,614
AIRPORT RUNWAY CLEARANCE INDICATING SYSTEM AND LIGHT UNIT
Filed Feb. 16, 1942  4 Sheets-Sheet 1
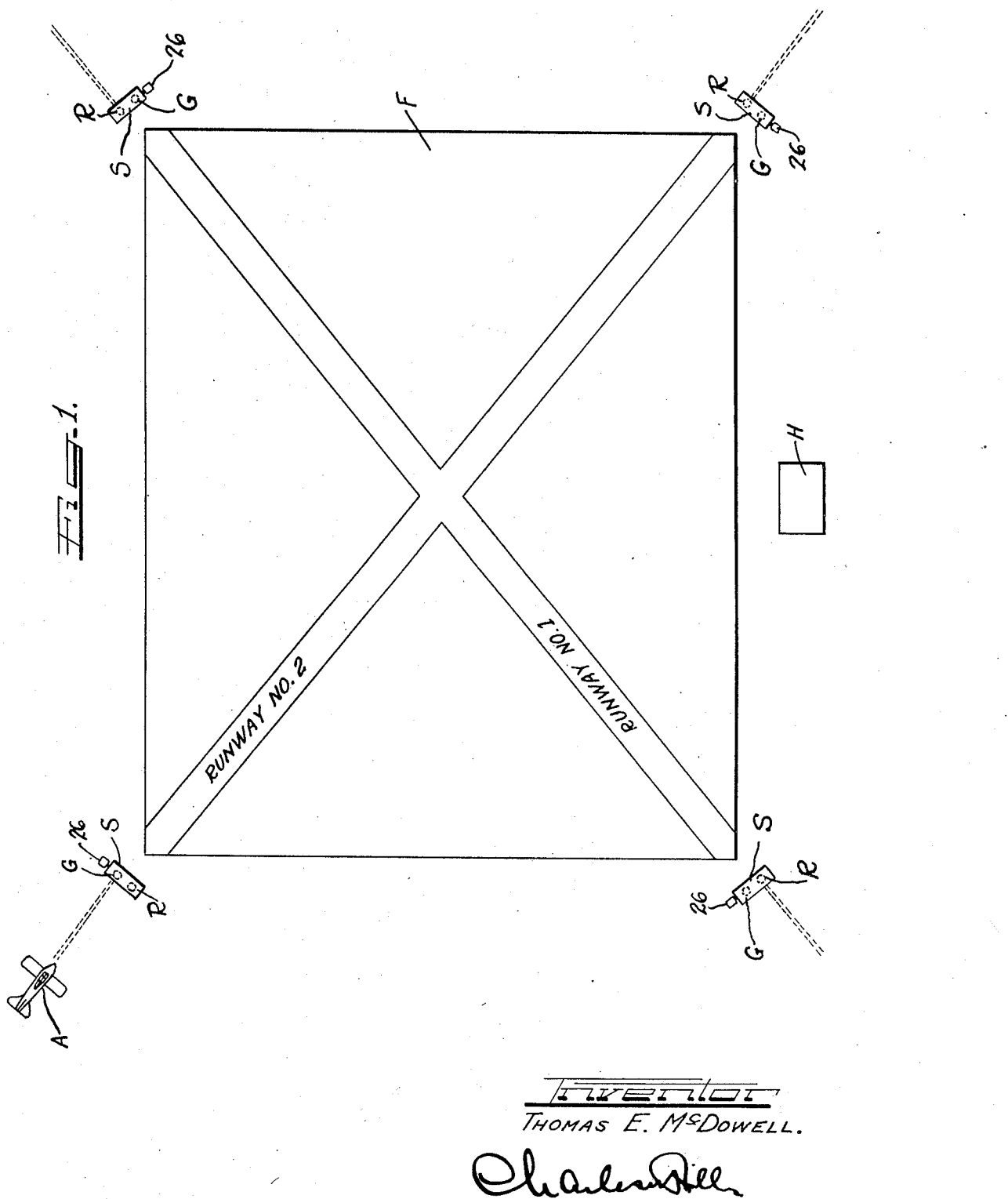
Inventor
THOMAS E. McDOWELL.
by Charles Hill
Attys.

Dec. 28, 1943.  T. E. McDOWELL  2,337,614
AIRPORT RUNWAY CLEARANCE INDICATING SYSTEM AND LIGHT UNIT
Filed Feb. 16, 1942  4 Sheets-Sheet 2
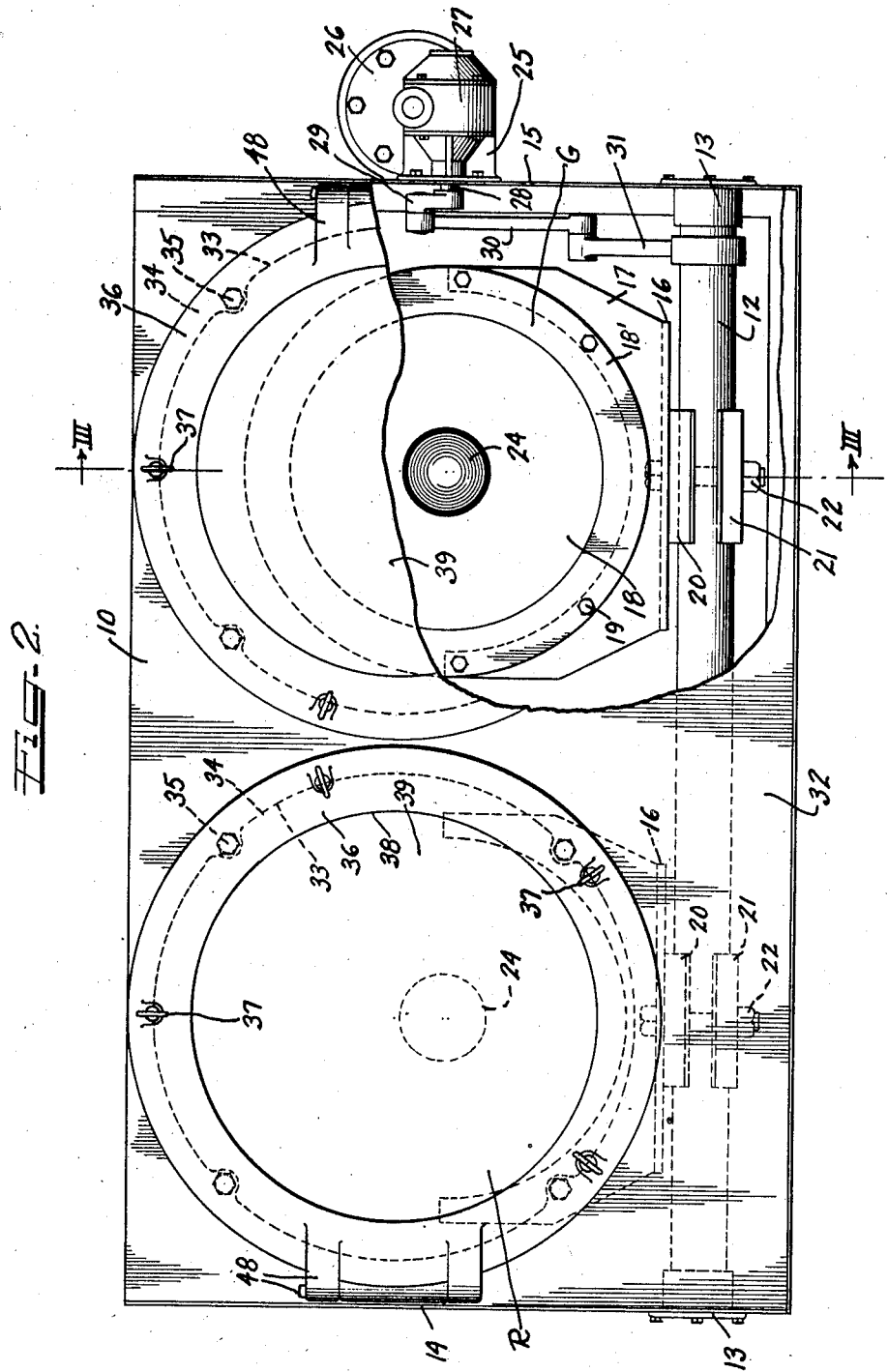
Inventor
Thomas E. McDowell.
by
Atty.

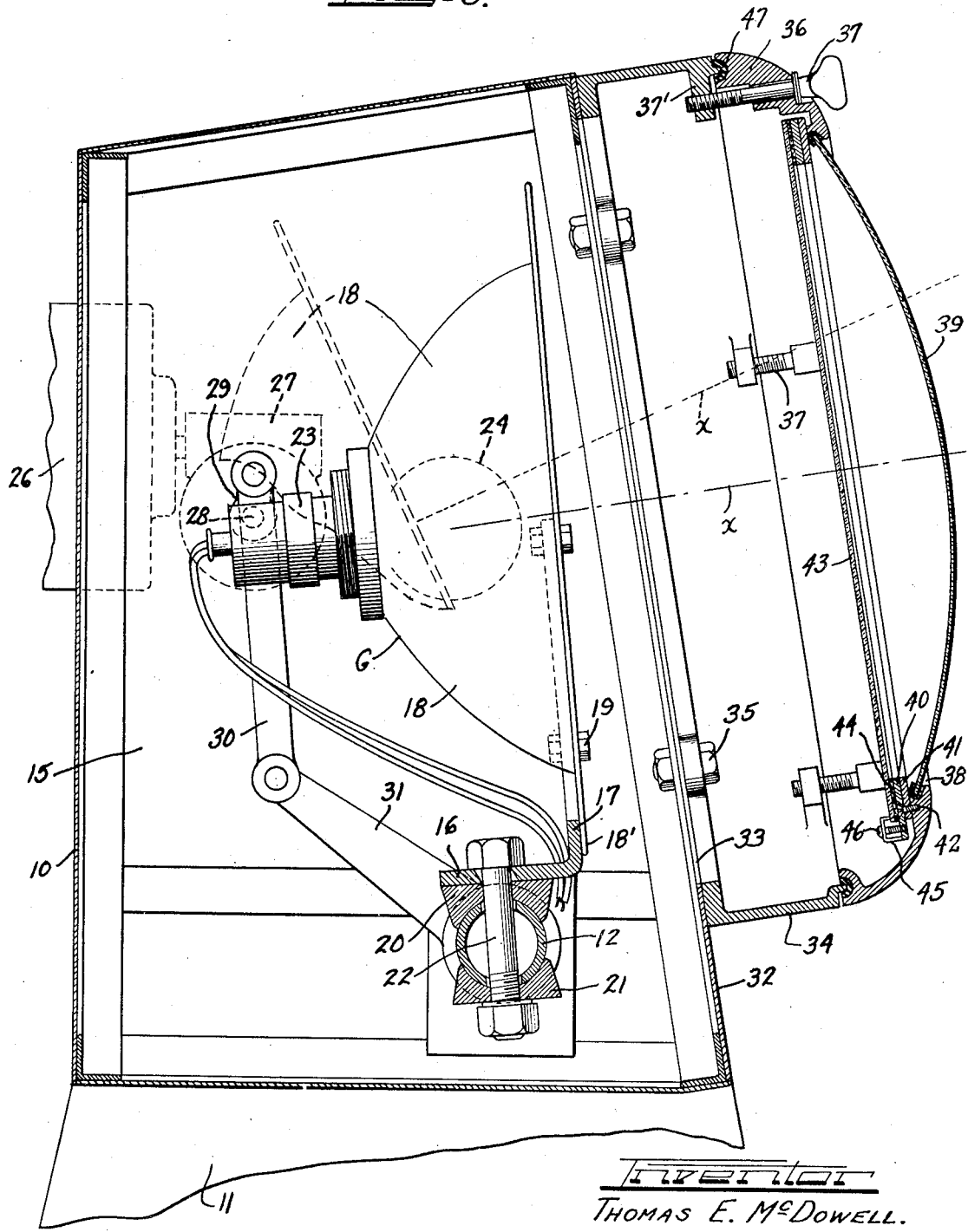

Dec. 28, 1943.    T. E. McDOWELL    2,337,614
AIRPORT RUNWAY CLEARANCE INDICATING SYSTEM AND LIGHT UNIT
Filed Feb. 16, 1942    4 Sheets-Sheet 4
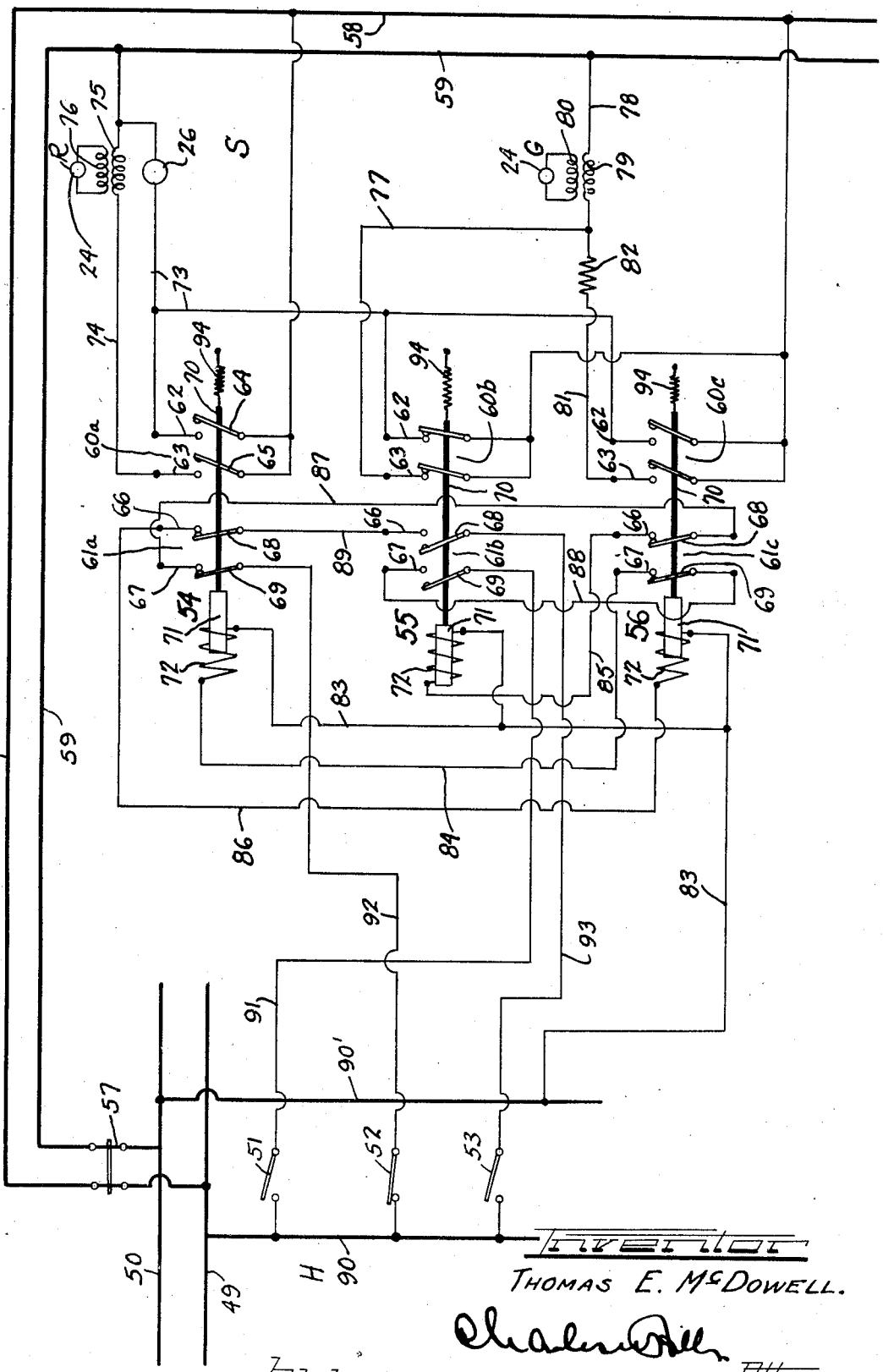
Inventor
Thomas E. McDowell.
by
Attys.

Patented Dec. 28, 1943

2,337,614

UNITED STATES PATENT OFFICE 2,337,614

AIRPORT RUNWAY CLEARANCE INDICATING SYSTEM AND LIGHT UNIT

Thomas E. McDowell, Chicago, Ill., assignor to The Pyle-National Company, Chicago, Ill., a corporation of New Jersey Application February 16, 1942, Serial No. 431,085

3 Claims. (Cl. 177—352)

My invention relates to an improved system and means for airports for signaling to incoming air pilots about to land which of the runways of the landing field is clear for landing and has been designated by the airport operator for such landing.

Before landing at an airport, particularly at a heavy traffic airport, the pilot first circles the landing field one or more times at a comparatively low altitude to get his bearings and signals as to the runway he is to land on, safety requiring that his landing be on a runway which is entirely clear and that he be signaled against landing on a runway which is in use.

An important object of my invention is to provide an improved signaling system and signaling unit for an airplane landing field selectively controllable by the airport operator for indicating to pilots about to land the particular runway on which landing should be made and for assisting and guiding the pilot in accurately approaching and landing on the runway.

A further object of the invention is to provide a signaling unit at the landing approach end of each runway for observation by a pilot about to land for indicating to him which runway he is to take and which runway he is to avoid.

A further important object of the invention is to provide in each signaling unit at least two signaling elements selectively operable for indication by one of the elements that the corresponding runway is open to the pilot for landing and the other element when operated indicating that the runway is closed to the pilot.

Another object is to provide in each signaling unit two light beam producing elements with the beam from one element of one color such as green and the beam from the other element of another color such as red, the green beam when projected indicating that the corresponding runway is open for landing and the red beam when projected indicating that the runway is closed to landing.

Still another important object is to provide for oscillation in a vertical plane of the beam projected from a signaling unit and through a vertical angle within which a pilot about to land will usually operate so that when a pilot approaches the oscillating beam will appear to be a flashlight or intermittent light thus making the beam more distinguishable from steady beams of lighting devices on the ground or adjacent to the landing field.

The various features of my invention are incorporated in the structure shown on the drawings, in which drawings Figure 1 is a plan of a landing field with my improved signaling units installed and with an article control system diagrammatically illustrated;

Figure 2 is a front elevation of one of the signaling units partially broken away;

Figure 3 is an enlarged section on plane III—III of Figure 2; and

Figure 4 is a switching and circuit diagram for selective control from a station of the lamps and motor at the signal units.

On Figure 1 is shown a rectangular landing field F with two diagonally extending runways, it being understood of course that the field may have other runways. In accordance with my invention a signaling unit S is located at the landing approach end of each runway for directing signals outwardly from the runway end in directions substantially parallel with the runway.

Figures 2 and 3 show the construction and operation of the signal units. Each unit, as shown, comprises a frame or housing 10 of substantially rectangular shape mounted on a suitable supporting base 11 so that the signal units will be comparatively close to the ground for passage thereover by the airplane for landing on the respective runway after the pilot has received the "clear" or green signal.

Extending longitudinally through the housing adjacent the bottom and front corner thereof is a shaft 12 journaled at its ends in suitable bearings 13 supported by the side walls 14 and 15 of the housing, the shaft supporting two beam projecting elements R and G. Each of these beam projecting elements comprises a base plate 16 having at its front end the upwardly extending flange or arcuate shaped wall 17 against the outer face of which engages the flange 18' of a reflector 18 to be secured as by screws or bolts 19, the reflector body extending rearwardly of the wall 17. The supporting base 16 engages a seating block 20 resting on top of the shaft 12, while a seating block 21 seats against the lower side of the shaft, the base 16, the seating blocks and the shaft having aligned passageways for a bolt 22 for clamping of the base 16 rigidly to the shaft.

The reflector body is secured to a socket structure 23 concentric therewith for supporting a lamp 24 within the reflector.

On the side wall 15 of the housing 10 is secured a bracket 25 supporting an electric motor 26 and the housing 27 for reduction gearing (not shown) for drive of a shaft 28 extending through the side wall 15 into the housing. At its inner end this shaft has secured to it a crank lever 29 which is connected by a link 30 with the end of an arm 31 secured to and extending from the shaft 12. The arrangement is such that when the motor operates, the crank arm 29 will effect movement of the link 30 and arm 31 for rocking of the shaft 12 and corresponding oscillation of the two beam projecting elements R and G in vertical planes. As shown on Figure 3, the crank lever is of such length that each beam projecting element will be oscillated in a vertical plane from the full line position to the dotted line position (Fig. 3), the lower or full line position being preferably such that the longitudinal axis of the beam will be at a slight angle, say, five degrees, above the horizontal and when the structure is in the upper or dotted line position the longitudinal axis of the beam will be at a greater angle above the horizontal so that the beams will oscillate together in vertical plane between these angles.

To compensate for the angularity of the beam projecting elements from the vertical, the front wall 32 of the housing is inclined rearwardly. This wall has the opening 33 around which is secured the annular frame 34 as by bolts 35, this frame at its outer end receiving an annular cover 36 which may be held in closed position by thumb screws 37 threading into lugs 37' on the frame 34. The cover 36 in its outer opening 38 seats a lens 39 through which is projected the beam from the reflector of the corresponding light element.

Secured to the cover 36 around the inner side of the cover opening 38 is an annular plate 40, a sealing gasket 41 being preferably interposed between the plate and the cover, the securing means shown being screws 42. The annular plate 40 supports a color screen 43 which may be a disk of glass or other material, a sealing pad 44 being preferably inserted between the screen and the plate. U-shaped clamps 45 are secured by screws 46 to the plate 40, one leg of these clamps engaging the plate and the other leg engaging the screen 43 so as to hold the screen in place.

Suitable sealing means 47 are provided between the cover 36 and the frame 34, and if desired, the cover may be mounted on the frame 34 by suitable hinge means 48 so that, after withdrawal of the clamping screws 37, the covers may be swung to open position for ready access to the interior of the housing. The screen 43 in front of the beam projecting element G is preferably green while the screen before the element R is preferably red.

The operation of the various signal units is selectively controllable from a station or building H located adjacent to the field. Figure 4 shows a switching and electrical circuit arrangement for selective control of the lamps for one of the signaling units, a similar switching and circuit arrangement being provided for each of the units. As shown on Figure 4 the switch operating and illuminating current is obtained from the conductors 49 and 50 of an alternating current supply circuit. In the station H there is a set of switches 51, 52 and 53 for each of the signaling stations S. The switch 51, when closed, will result in the illumination of the red lamp at the corresponding station, while the closure of switch 52 will result in the illumination of the green lamp at that unit. Closure of the switch 53 will result in illumination of the green lamp at that station at lesser candle power for night service.

The switches 51, 52 and 53 control the circuits for relays 54, 55 and 56 which in turn control switches for the selection of the desired lamps. These relays may be located at the station H but are preferably mounted within the respective signaling unit housings. At the station H switches 57 are located for extending current supply from the main line conductors 49 and 50 through conductors 58 and 59 to the signaling units for the motor and lamp circuits controlled by the relay operated switches. Each relay controls a switch for the motor circuit and the circuit for one of the lamps, and a cut out switch for preventing current flow through the other lamp while one lamp is illuminated. The relay 54 controls the switch 60a for the motor 26 and the red lamp 24 at the unit, and the cut out switch 61a. The relay 55 controls the current supply switch 60b for the motor circuit and for the circuit for the green lamp 24 for daylight operation, and the cut out switch 61b. The relay 56 controls the switch 60c for the motor circuit and for the green light for night service, and the cut out switch 61c. The motor and lamp switch for each relay comprises stationary contacts 62 and 63 and movable contacts 64 and 65, and the cut out switch for each relay comprises stationary contacts 66 and 67 and the movable contacts 68 and 69. The movable contacts at each relay are all connected with a bar 70 extending from the relay armature 71 for which the energizing coil 72 is provided. The contacts 62 of the switches are all connected to a conductor 73 which connects with the supply wire 59 and includes the motor 26 for the unit. The movable contacts 64 and 65 at each relay are connected with the supply conductor 58.

At the relay 54, the sttaionary contact 63 is connected with the supply wire 59 by conductor 74 which includes the primary coil 75 of a transformer whose secondary circuit 76 includes the red illuminating lamp 24.

The stationary contact 63 at the relay 55 is connected by a conductor 77 with the conductor 78 leading to the supply wire 59, the conductor 78 including the transformer primary coil 79, the green illumination lamp 24 being included in the transformer secondary circuit 80. The stationary contact 63 at relay 56 is connected by a conductor 81 through a resistance or choke coil 82 with the conductor 78 in advance of the transformer primary coil 79, the current flow through this circuit, when closed, being modified by the coil 82 for cutting down the candle power of the green illumination lamp for night service. Other means, known in the art, may be employed for modifying the current flow for dimming the lamp.

One terminal of the relay coils 72 for the three relays is connected by conductor 83 with the supply wire 90' at the station H leading from the supply conductor 50. The other terminal of the coil for relay 54 is connected by conductor 84 with the stationary terminal 67 of the cut out switch 61c at the relay 56. The other terminal of the coil of relay 55 is connected by conductor 85 with the stationary terminal 66 at the cut out switch 61c. The other end of the coil 72 for relay 56 is connected by conductor 86 with the stationary terminal 66 of the cut out switch 61a. The stationary contact 67 of cut out switch 61a is connected by conductor 87 with the movable contact 68 at cut out switch

61c. A conductor 88 connects the stationary contact 67 at switch 61b with the movable contact 69 and switch 61c. Conductor 89 connects the movable contact 68 of switch 61a with the stationary contact 66 at switch 61b.

At the station H, the switch 51 is included in the circuit 91 extending from supply wire 90 leading from the main line 49, the circuit 91 terminating at the movable contact 69 of the switch 61b. The switch 52 is included in the circuit 92 extending from the supply wire 90 to the movable contact 69 of the switch 61a. The switch 53 is included in the circuit 93 extending from the supply wire 90 to the movable contact 68 of the switch 61b.

The armature 71 and its operating bar 70 for each relay is normally held, as by a spring 94, towards the right when the relay is deenergized, in which normal position the movable contacts of the motor and lamp controlling switches will be held disengaged from the contacts 62 and 63, but the movable contacts of the cut out switches will be in engagement with the stationary contacts. Upon energization of a relay, the corresponding cut out switch will be opened and the motor and lamp controlling switch will be closed.

On Figure 4, the switches 51 and 53 are open and the switch 52 is closed for illumination of the green light of the signaling unit, the corresponding main switch 57 having been closed for current supply to the relay controlled circuits. The green light may be for the signaling unit at the left end of runway No. 2 (Fig. 1) for giving the "clear" signal to the pilot in the airplane A which is about to land. Upon closure of the switch 52 current will flow from the supply lead 90 through conductor 92 through the left side of closed switch 61a, through conductor 87, the closed right side of switch 61c, conductor 85, through the coil of relay 55 and through conductor 83 to the supply wire 90' which at station H, extends from the main supply circuit wire 50. Relay 55 will now be energized to close switch 60b and open the cut out switch 61b. Current will now flow from supply wire 58 through the two sides of the switch 60b for current flow through conductor 73 and the motor 26 to the supply wire 59 and current flow through conductor 77 and the primary coil 79 of the transformer whose secondary circuit includes the green illuminating lamp 24. The motor will oscillate the signaling unit for oscillation of the green beam in a vertical plane to advise the pilot in the airplane A that the left end of runway No. 2 is clear for landing. With the green beam in operation, it will be impossible to connect the red beam lamp in circuit because, even if switch 51 for the red beam lamp were closed, the circuit 91 would be open at the cut out switch 61b which was opened when the relay 55 was energized. Likewise the circuit 93 is held open at the switch 61b. While the green beam lamp is operating at one of the signaling stations, the switches 51 for all the other signaling stations will be closed for operation of the units at these other stations for oscillation of the red beam to indicate to the aviator that he can not land at the respective ends of the runways. At these other stations, when the corresponding signaling units are to operate the red beam, the switch 51 is closed and the other switches 52 and 53 opened. The current flow will then be through conductor 91 through the left side of cut out switch 61b, which will now be closed, then through conductor 88, the left side of cut out switch 61c, the conductor 84, through the coil 72 of relay 54 and through conductor 83 to the supply wire 90' which connects with the main supply wire 50. Relay 54 will now open its cut out switch 61a to open the circuits in which switches 52 and 53 are included, and switch 60a will be closed for current flow through the motor 26 and the red beam projecting lamp 24 at the respective signaling units.

During the day time, particularly when the sun is shining, the green lamp should burn under sufficient candle power so that the green beam can be readily distinguished by the pilot. However, at night time, it will be unnecessary to have the green lamp of such intense candle power and the resistance 82 is therefore provided in the circuit for night operation of the green lamp. Upon closure of the switch 53 with switches 51 and 52 open, current will flow through the conductor 93, the right side of the closed cut out switch 61b, the right side of the closed cut out switch 61a, conductor 86, and the coil of relay 56, and through conductor 83 to supply wire 90'. The energized relay 56 will now open its cut out switch 61c to open up the circuits controlled by switches 51 and 52 and will close the switch 60c for current flow through the motor 26 and current flow through the coil 82 and the primary 79 of the transformer which supplied the green lamp, thus reducing the candle power of the lamp to the desired degree for night operation.

As the reflectors for the lamps are parabolic and comparatively small, the projected beams will be of comparatively small and substantially uniform cross section so that when a pilot approaches the end of the runway within the angular vertical oscillation range of the beam, the beam will move vertically up and down beyond the pilot's eyes so that to the pilot it will appear that the light is off and on, or is an intermittent or flashlight. This apparent flash operation distinguishes from constant illumination from other lighting sources on or around the landing field, and makes it more certain to the pilot that the light he is following is intended for his information, that the runway is clear for his landing. The sharp beam or pencil of light oscillating in a vertical plane parallel with the runway he is approaching, will also serve to guide him for accurate approach to the runway.

My improved signaling arrangement is of particular importance for signaling pilots who have no radio equipment. Such pilots usually circle the landing field one or more times until they find the green light which is their signal for landing on the designated runway. Pilots equipped with radio may be advised by the station operator to look for the green light at the specified end of a certain runway and they will then have no difficulty in finding this green light for guiding them to landing. By means of the controls provided for the operator at the station, he can quickly set in operation the green beam at the desired signaling unit, and connect in the red beam at the other units to warn pilots against landing on the runways from which the red beams are projected.

I have shown a practical and efficient embodiment and application of the features in my invention, but I do not desire to be limited to the exact construction, arrangement and operation shown and described as changes and modifications may be made without departing from the scope of the invention.

I claim as my invention:

1. In a system for indicating runway clearance at airports, a signal unit comprising a housing, a shaft extending longitudinally through said housing, a pair of lamp-reflector units within said housing mounted on said shaft, a motor mounted on said housing, leverage connecting said motor with said shaft for oscillation of said shaft and units and projection of light beams from said unit through a vertical arc, electrical circuits for said motor and said units, and control means for disconnecting one of said units for circuit while the other unit is connected in circuit and with said motor connected in circuit with either unit.

2. In a system for indicating runway clearance at airports, a signal unit comprising a housing, a pair of light units within said housing, a shaft journalled in said housing on which said light units are secured for oscillation therewith, an electric motor on said housing and a connection therefrom to said shaft for oscillation thereof and of said lighting units, an electrical circuit for each lighting unit, a circuit for said motor, and switch means for said circuits operable to close the circuit for one of said light units and to prevent closure of the circuit for the other light unit and to connect said motor circuit for operation of the motor for oscillation of said light units and oscillation of the beam projected from the connected unit.

3. In a system for indicating runway clearance at airports, a signalling unit comprising a housing, a pair of light units in said housing, a shaft journalled in said housing on which said light units are mounted, an electric motor on said housing and a connection therefrom to said shaft for oscillation by the shaft of said units through a vertical angle, an electrical circuit for each of said lighting units and an electrical circuit for such motor, a switch assembly for each of said light unit circuits and for said motor, said switch assemblies being selectively controllable from a remote point and being interconnected whereby when one of said switch assemblies is operated said motor circuit and the corresponding light unit circuit will be closed and the circuit for the other lighting unit will be held open.

THOMAS E. McDOWELL.